June 2, 1936. E. G. BAER ET AL 2,042,577
VARIABLE SPEED GEARING
Filed Jan. 19, 1935 3 Sheets-Sheet 1
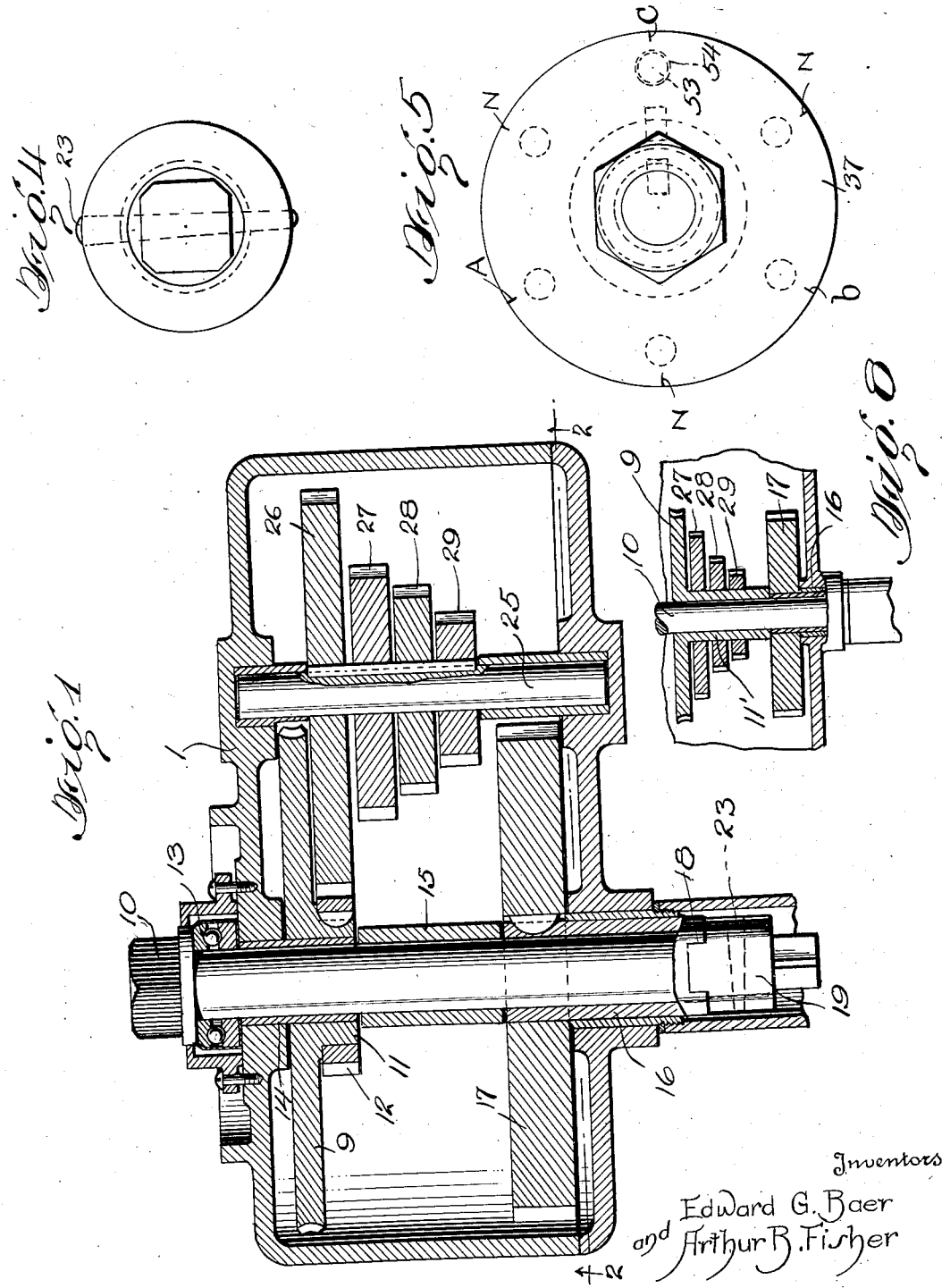
Inventors
Edward G. Baer
and Arthur B. Fisher
By C. F. Haden
Attorney June 2, 1936. E. G. BAER ET AL 2,042,577
VARIABLE SPEED GEARING
Filed Jan. 19, 1935   3 Sheets-Sheet 2

Inventors
Edward G. Baer
Arthur B. Fisher
By C. F. Haden
Attorney

June 2, 1936.  E. G. BAER ET AL  2,042,577

VARIABLE SPEED GEARING

Filed Jan. 19, 1935  3 Sheets-Sheet 3

Inventors
Edward G. Baer
and Arthur B. Fisher
By C. F. Haden
Attorney

Patented June 2, 1936

2,042,577

UNITED STATES PATENT OFFICE 2,042,577

VARIABLE SPEED GEARING

Edward G. Baer and Arthur B. Fisher,
Orrville, Ohio

Application January 19, 1935, Serial No. 2,592

2 Claims. (Cl. 74—363)

This invention relates to variable speed gear transmission especially designed for stoker use.

A primary object of the invention is to construct a gear case having a number of different reduced gear speeds, accomplished by a minimum of moving parts which may be arranged in a small compact unit.

Another object is to so construct such a unit that the gears will be always in mesh thereby avoiding all danger of stripping or clashing of the gears when changing from one speed to another.

Another object is to construct the gear case so that the speeds may be changed with ease when the motor is either operating or idle, and which provides a positive and continuous drive and which prevents any possibility of skipping any teeth.

Another object is to provide a transmission of this character which may have any number of speed changes.

In carrying out these objects the invention is susceptible of modifications without departing from the spirit or sacrificing any of the advantages of the claimed invention.

In the accompanying drawings:

Fig. 4 is detail end view showing the shear pin;

Fig. 5 is an end view taken from the right of Fig. 3;

Fig. 7 is a horizontal section of a modified form; and

Fig. 8 is a detail sectional view.

Figure 1:
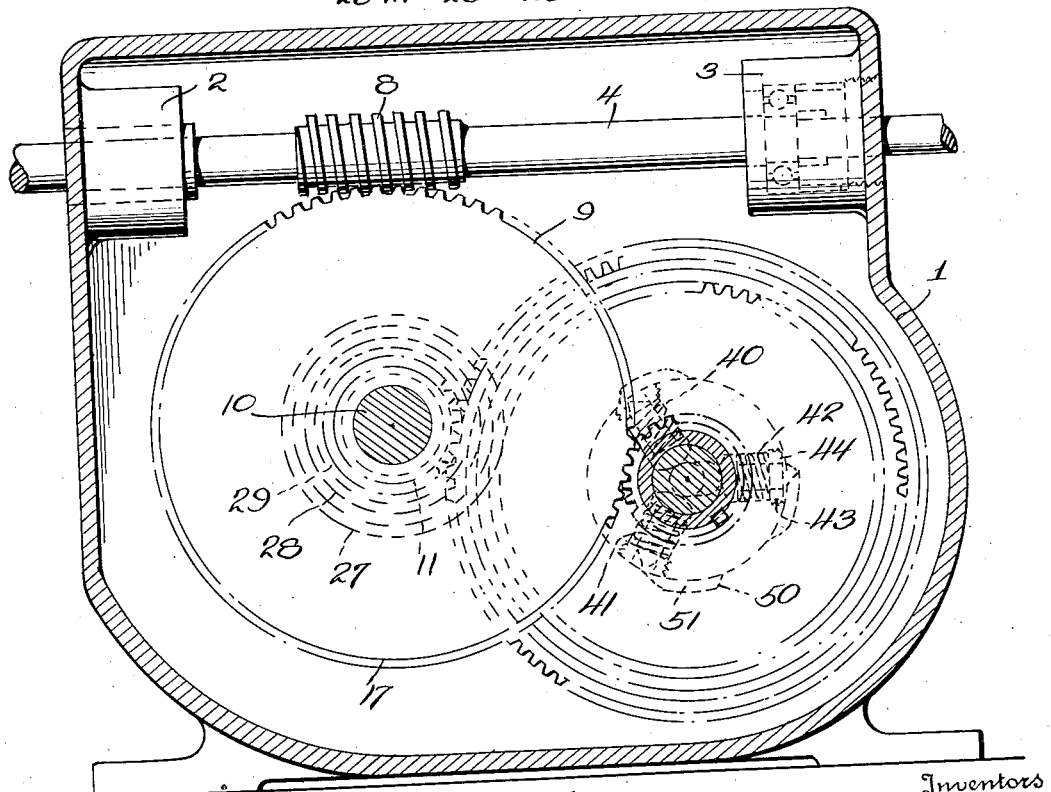
Figure 1 represents a horizontal section taken on the line 1—1 of Fig. 2.

In the embodiment illustrated a gear casing 1 has bearings 2 and 3 at opposite sides. A shaft 4 is mounted in these bearings 2 and 3 and projects beyond gear casing 1 at both ends. On one end of shaft 4, outside of casing 1, a pulley 5 is mounted while on the other end of said shaft 4, outside of casing 1 a fan blower 6 is mounted and provides air necessary for combustion. A motor, not shown, is conveniently situated and connected to pulley 5 by a belt 7 or other suitable means. Inside casing 1 shaft 4 carries a worm 8 which engages and drives a worm wheel 9 mounted to rotate freely upon a conveyor driving shaft 10. A gear 12 is fixed to the hub 11 of worm wheel 9, and shaft 10 is provided with a suitable thrust bearing 13. As illustrated in Fig. 1 a bushing 14 is mounted upon shaft 10 and worm wheel 9 is mounted to run loosely upon bushing 14. A spacing sleeve 15 carried by shaft 10 contacts at one end with bushing 14 and at the other end with a bearing sleeve 16 also on shaft 10. A gear 17 is fixed to bearing sleeve 16 opposite worm wheel 9 inside casing 1. This bearing sleeve 16 projects thru the wall of casing 1 and on its outer end is provided with clutch teeth as indicated at 18, Fig. 1. A collar 19 having complementary clutch teeth in engagement with the clutch teeth on sleeve 16 is mounted upon shaft 10 outside of casing 1.

A shearing pin 23 is passed thru alining holes in clutch collar 19 and conveyor driving shaft 10. It is intended that this shearing pin be made of some substance which will break and stop the driving of the conveyor before it is damaged should a piece of iron, a bone, a stone or any other unyielding substance get into the coal carried by the conveyor. Upon the breaking of shearing pin 23 all the driving mechanism up to and including collar 19 will run idly until another shearing pin be inserted to re-connect the clutch collar 19 with shaft 10.

Figure 2:
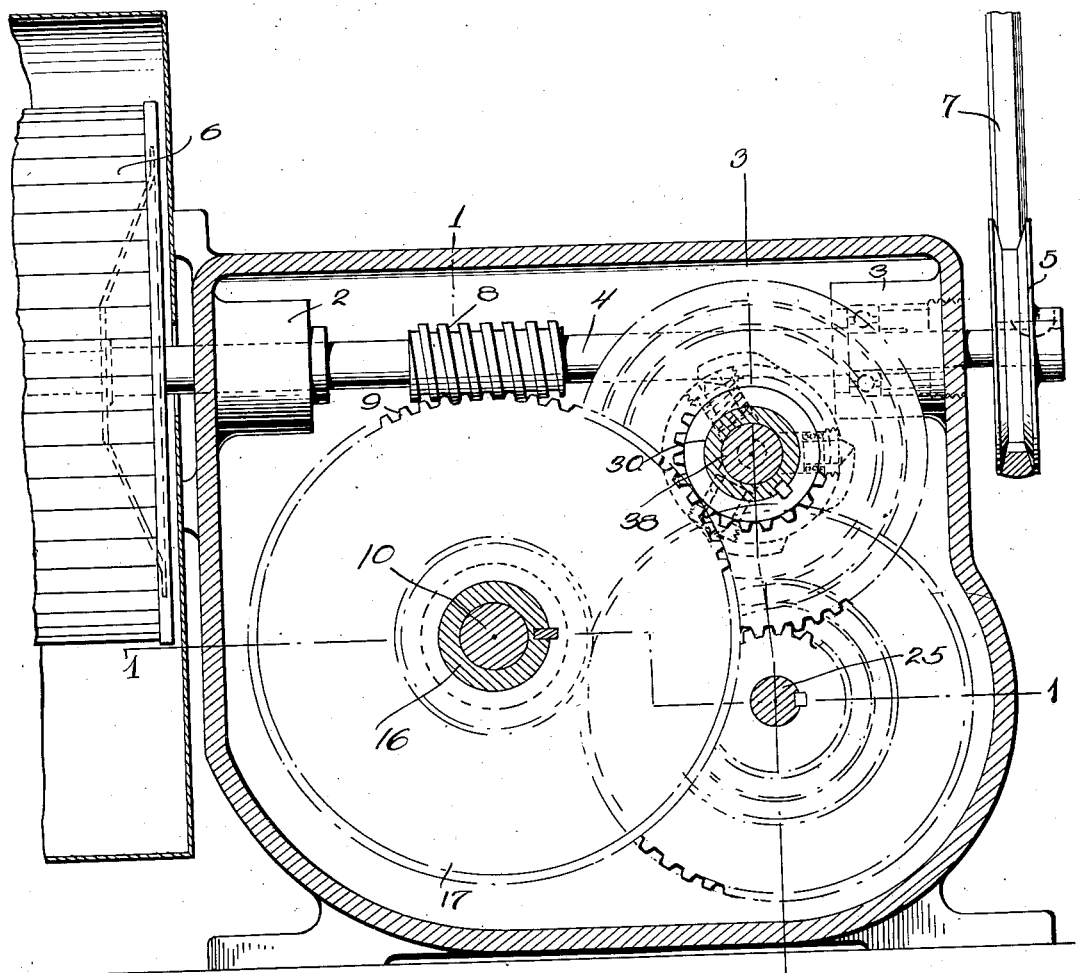
Fig. 2 is a vertical section taken on the line 2—2 of Fig. 1.
Figure 6:
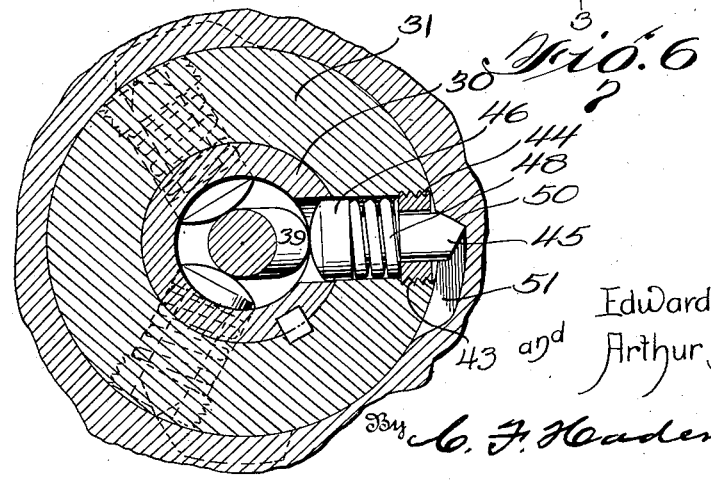
Fig. 6 is a vertical section showing the shifting feature of the gear transmission.
Figure 3:
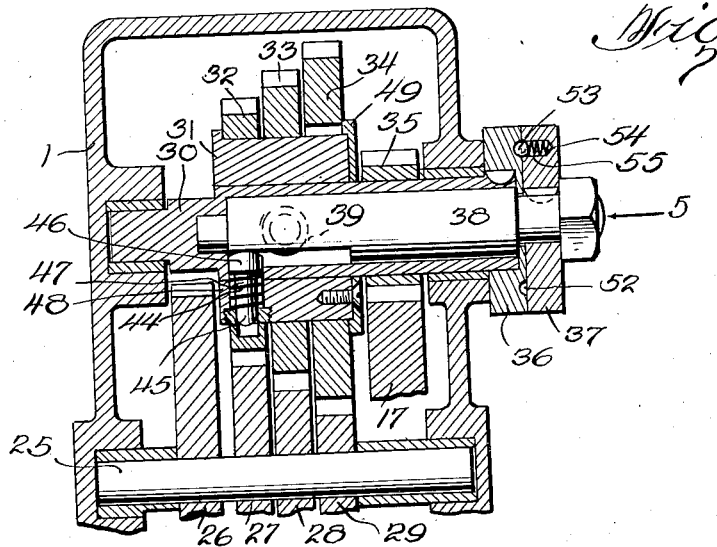
Fig. 3 is a detail sectional view taken on the line 3—3 of Fig. 2.

In the form illustrated in Figs. 1, 2 and 3 a jack shaft 25 upon which transmission gears 26, 27, 28 and 29 are keyed, is shown. Gear 26 is in constant engagement with gear 12 on hub 11 of worm wheel 9 and gears 27, 28 and 29 are also always in mesh respectively with selective gears 32, 33 and 34 rotatably mounted on a drum 31. This drum 31 is mounted upon shaft 30 to which it is held fixedly by selective pawls 40, 41 and 42. Shaft 30 is bored thruout the greater part of its length producing a hollow cylinder in which is mounted a cylinder 38 which near its inner end is cut away leaving a greatly reduced pawl actuating portion or cam 39.

Drum 31 and hollow shaft 30 have holes drilled in alinement with gears 32, 33 and 34. In this case the drilled holes are spaced 120° apart circumferentially to provide a symmetrical spacing where three gears are used, but if two gears were employed the spacing would be preferably 180°; if four gears were employed the spacing would be preferably 90° and so on.

For a short way inward from the outer surface of drum 31 the drilled holes are enlarged by counterboring at 43 and the walls of the counterbored part are screw-threaded for the reception of an exteriorly threaded ring 44. A sliding pawl having an enlarged cam head 46 is placed in each bore thru the drum 31 and hollow shaft 30. Projecting from each head 46 is a stem 47, sufficiently small to accommodate a coiled spring 48 between the stem 47 and the wall of the drilled hole and to pass thru ring 44 seated in counter-bore 43.

To assemble this selective mechanism the drilled holes in shaft 30 and drum 31 are brought into registration and a pawl is placed in these holes head first, a spring 48 is dropped over stem 47 and a ring 44 screwed into place and gear 32 is then slid upon drum 31. The same steps are taken with gears 33 and 34 and their pawls. A ring plate 49 is then fastened to the end of drum 31 to hold the assembled elements in place.

Normally each pawl is held in its inward or disengaged position by its spring 48, but when shaft 38 is turned so its uncutaway or cam portion 39 contacts one of the pawl heads 46 that pawl is pushed outwardly against the pressure of its spring 48 and stem 47 projects thru ring 44 and beyond the outer surface of drum 31 sufficiently far for its properly formed end 45 to engage the end wall 50 of recess 51 cut in the inner surface of its respective gear wheel 32, 33 or 34 thus locking the selected gear to the drum 31 and shaft 30. When it is desired to change to neutral or to another speed, the shaft 38 is rotated and its cam part 39 is turned away from pawl head 46. The spring 48 together with the pressure exerted by the load on the tapered end 45 causes the pawl to become disengaged from its gear and permits the free rotation of the shaft to its selected angular position. This it does even when under heavy load as the driving force itself tends to push the pawl in. Only one gear can be engaged at a time as the eccentric on shaft 38 can only engage with one of the driving pawls at a time.

Keyed to the outer end of shaft 30 is a collar plate 36 having six hemispherical depressions 52 bored in its outer face and spaced apart 60° circumferentially. On the periphery of the collar plate 36 these impressions are indexed, three of them being lettered A, b, C and the others which alternate with the lettered depressions are marked N, meaning neutral. A is in alinement with the pawl which locks gear 34 to the drum 31 and shaft 30; b is in alinement with the pawl which locks gear 33, and C alines with the pawl which locks gear 32.

Keyed to the outer end of shaft 38 is a disk or dial 37 which carries on its inner face a single ball pawl 53 which is projected outwardly by a spring 54 seated behind the ball in a recess 55 for engagement with the selected depression in collar plate 36. On the periphery of disk 37 the marks on collar plate 36 are duplicated, consequently when disk 37 is turned, the uncutaway or cam portion 39 of shaft 38 is carried with it and may be brought into registration with the pawl which locks the desired gear or with any neutral point between the gear locking positions.

A pinion 35 is fixed to shaft 30 and is always in mesh with gear 17 fixed to clutch sleeve 16 mounted on shaft 10.

Fig. 7 illustrates a modification that dispenses with a jack shaft, permitting a more compact and less expensive arrangement. In this construction gears 12 and 26 are unnecessary and are not used. Hub 11 of worm gear 9 is extended and takes the place of spacing sleeve 15; gears 27, 28 and 29 which, in the form first described, were carried by jack shaft 25 are keyed to hub 11' of worm wheel 9 and the parts so positioned that gears 27, 28 and 29 are always in mesh with selective gears 32, 33 and 34 respectively, otherwise the two constructions are identical.

The operation is as follows: shaft 4 is driven and the worm 8 carried thereby drives worm wheel 9. Worm wheel 9 has a pinion 12 fixed to its hub 11 which is always in mesh with gear 26 keyed to jack shaft 25. Gears 27, 28 and 29 which are also keyed to jack shaft 25 are always in mesh with selective gears 32, 33 and 34 respectively which turn loosely upon drum 31 except when one of them is locked to drum 31 and shaft 30, then it turns shaft 30 to which pinion 35 is keyed, and as pinion 35 is always in mesh with gear 17 keyed to clutch sleeve 16, motion is communicated to the conveyor driving shaft 10 when clutch collar 19 is held fixed to shaft 10 by its shearing pin.

To recapitulate, the advantages and features of this gear transmission are as follows:

The teeth of the gears are in mesh at all times, even when shifting to different speeds, which prevents the possibility of stripping any gears and also enables a standard tooth section to be used, and which is naturally stronger than a special tooth. The operator can shift from one speed to another with ease and without stopping the motor. It provides a positive and continuous drive for the coal screw when used in connection with a stoker and there is no chance of skipping any teeth.

We do not wish to be restricted to the exact construction shown and described but desire to cover all mechanisms within the scope of the claims since many variations may be made without departing from the invention. For instance, the shearing pin might be located any place in the gear train; for example, between gear 12 and its shaft, the hub 11 of worm wheel 9; between gear 26 and its shaft 25, or between pinion 35 and its shaft 30, and the pawl mechanism might be located in shaft 10 or shaft 25.

We claim as our invention:

1. In a reduction gearing for stokers the combination of a driving shaft and means for driving it, a worm on the driving shaft, a worm wheel rotatably mounted upon the stoker conveyor shaft and in engagement with the worm on the driving shaft said worm wheel having an extended hub, a plurality of gears keyed to the hub of the worm wheel, a hollow shaft parallel with the stoker conveyor shaft, a drum upon the hollow shaft, the drum and the hollow shaft having registering holes therein, a plurality of spring retracted pawls located in the registering holes, a plurality of gears rotatably mounted upon the drum each gear in registration with one of the pawls and having a recess in its inner edge having pawl engaging walls, a control cam rod in the hollow shaft, means on the outer end of the control cam rod to manipulate it and bring the cam into engagement with any selected pawl to project it beyond the periphery of the drum and lock the gear in registration therewith to the drum whereby the hollow shaft is rotated, a gear fixed to the hollow shaft, a bearing sleeve rotatably mounted upon the stoker conveyor shaft, a gear fixed to the bearing sleeve and meshing with the gear fixed to the hollow shaft, clutch teeth on the outer end of the bearing sleeve, a collar on the stoker conveyor shaft having cooperating clutch teeth in engagement with the clutch teeth of the bearing sleeve and a shearing pin passing through registering holes in the stoker conveyor shaft and the collar.

2. In variable speed gearing the combination of a work shaft, a gear rotatably mounted upon the work shaft, a plurality of different size gears fixed to the hub of the gear on the work shaft, a hollow counter shaft, a drum rotatably mounted upon the hollow counter shaft the drum and the hollow counter shaft having a plurality of pawl-carrying registering holes, pawls in the holes, a plurality of gears on the drum registering with the pawls and meshing with the gears fixed to the hub, means within the hollow counter shaft to selectively project the pawls out of the holes in the drum to engage a gear thereon to lock the gear the drum and the counter shaft together, a gear fixed upon the counter shaft, a second gear rotatably mounted upon the work shaft and in mesh with the gear fixed to the counter shaft, a collar upon the work shaft, means to rotate the collar by the second named gear upon the work shaft, means for connecting the collar and the work shaft and means for driving the first gear mentioned carried by the work shaft.

EDWARD G. BAER.
ARTHUR B. FISHER.